United States Patent [19]

Kobayashi et al.

[11] Patent Number: 4,980,518
[45] Date of Patent: Dec. 25, 1990

[54] COORDINATE INPUT APPARATUS

[75] Inventors: Katsuyuki Kobayashi, Tokyo; Shinnosuke Taniishi, Kawasaki; Takeshi Kamono, Yokohama; Kiyoshi Kaneko, Yokohama; Yichiro Yoshimura, Yokohama; Ryozo Yanagisawa, Matsudo, all of Japan

[73] Assignee: Canon Kabushiki Kaisha, Tokyo, Japan

[21] Appl. No.: 530,480

[22] Filed: Jun. 1, 1990

Related U.S. Application Data

[63] Continuation of Ser. No. 419,704, Oct. 11, 1989, abandoned.

[30] Foreign Application Priority Data

Oct. 20, 1988 [JP] Japan .............................. 63-262708
Oct. 20, 1988 [JP] Japan .............................. 63-262710
Oct. 27, 1988 [JP] Japan .............................. 63-269487

[51] Int. Cl.$^5$ ............................................. G08C 21/00
[52] U.S. Cl. ......................................... 178/18; 340/706
[58] Field of Search .................. 178/18, 19; 340/706

[56] References Cited

U.S. PATENT DOCUMENTS 4,665,282  5/1987  Sato et al. ........................... 178/18
4,853,496  8/1989  Taniishi .

Primary Examiner—Stafford D. Schreyer
Attorney, Agent, or Firm—Fitzpatrick, Cella, Harper & Scinto

[57] ABSTRACT

A coordinate input apparatus comprises: a vibration pen to generate a vibration; a vibration propagating plate to propagate the vibration generated by the pen by touching the pen to the plate; vibration sensors to detect the vibration propagated to the plate; a supporting member which supports the plate and whose vibration propagating velocity is slower than the plate; a position coordinate calculating circuit to calculate the position coordinates of the pen on the plate on the basis of the detection signals from the sensors; and a display which is provided below the supporting member and displays the calculated coordinates. The plate is made of metal or transparent glass and the supporting membrr is made of a transparent synthetic resin. The supporting member is directly in contact with the plate at a rough surface, its acoustic impedance value is different from the plate, and its vibration attenuation ratio is larger than that of the plate. Since the vibration wave component propagated to the sensors is not influenced by the interference of the vibration propagated in the support member, the coordinates can be accurately detected on the basis of the vibration detection waveforms without distortion.

13 Claims, 6 Drawing Sheets

COORDINATE INPUT APPARATUS

This application is a continuation of application Ser. No. 419,704, filed Oct. 11, 1989, now abandoned.

BACKGROUND OF THE INVENTION

1. Field of the Invention

The present invention relates to a coordinate input apparatus and, more particularly, to a coordinate input apparatus in which the vibration which was input from a vibration pen is detected by a plurality of sensors attached to a vibration propagating plate and the coordinates of the vibration pen on the vibration propagating plate are detected.

2. Related Background Art

Hitherto, various coordinate input apparatuses using an input pen, a tablet, and the like have been known as apparatuses for inputting hand-written characters, figures, or the like to a processing apparatus such as a computer or the like. In such a kind of system, image data comprising input characters, figures, and the like is output to a display apparatus such as a CRT display or the like or a recording apparatus such as a printer or the like.

The following various kinds of systems have been known in the detection of coordinates on the tablet in such apparatus.

(1) A system in which a change in resistance value of a sheet material arranged so as to face resistance films is detected.

(2) A system in which an electromagnetic or electrostatic induction of conductive sheets or the like arranged so as to face each other is detected.

(3) A system in which an ultrasonic vibration which is propagated from the input pen to the tablet is detected.

However, the above conventional apparatuses have the following drawbacks.

That is, in the case of the type using the resistance film, uniformity of a resistance member directly exerts an influence on the figure inputting accuracy, so that a resistance member having a particularly excellent uniformity is necessary and the costs are relatively high when considering its accuracy and resolution. Since two resistance films, for the X coordinate, and for the Y coordinate are needed, there is also a drawback such that a degree of transparency deteriorates.

On the other hand, in the case of the type using the electromagnetic induction, since electric wires are arranged in a matrix form, the sheet is not transparent. Such a type is improper when the sheet is to be used by overlapping on an original, a display, or the like.

Further, in the case of the conventional coordinate input apparatus using the ultrasonic vibration, there is used a system in which a delay time until the vibration generated by the input pen propagates in the vibration propagating plate and reaches a converting element is detected. In such a system, if the surface wave is used, in the case where a hand is put on the vibration propagating plate or an object is placed thereon while coordinates are being input by the input pen, or in the case where a scratch or the like exists on the surface of the vibration propagating plate, there is a drawback that the surface wave cannot pass through such a portion and the surface wave cannot reach the sensors, so that the coordinates cannot be detected.

On the other hand, the foregoing phenomenon in the case of the plate wave which propagates in a thin plate is not so typical as in the case of the surface wave. Even in the case where a hand is put on the progagating medium, the vibration can pass such a portion although it is slightly attenuated. Therefore, in the case of constructing the coordinate input apparatus according to such a system, the coordinates can be more stably detected by using the plate wave rather than by using the surface wave.

The plate wave is a wave which propagates in a finite thickness and is also called a ram wave. When considering construction, size, and weight of the apparatus and input vibration energy (which largely influences the electric power consumption) and the like, in the case where a material of the vibration propagating plate is, for instance, aluminum, its thickness is set to a value within a range from a fraction of a mm to about 2–3 mm. Therefore, when the coordinate input apparatus increases in size, the vibration propagating plate also increases in size. For instance, when the coordinates are input or the like, the input surface is largely deformed and not only does the operability deteriorate but also the mechanical strength cannot be held for a long time.

On the other hand, in the case of the plate wave elastic wave, not only the vibration occurs in the surface portion of the tablet but also the whole plate itself of the tablet vibrates, so that the back surface also simultaneously vibrates together with the tablet input surface.

Therefore, if the member supporting the tablet to propagate the plate wave elastic wave is made of a material such as a resin or the like which absorbs ultrasonic waves relatively well, the vibration is largely attenuated. Thus, the vibration cannot be stably input by the vibration sensors and the coordinates cannot be detected with a high accuracy. On the other hand, since the effective vibration propagating distance also decreases under the same vibration input conditions, a problem that the size of the input surface is limited also occurs.

SUMMARY OF THE INVENTION

It is the first object of the invention to provide a coordinate input apparatus in which a vibration propagating velocity of a supporting member which is directly in surface contact with a vibration propagating plate and supports the vibration propagating plate is set to be slower than a vibration propagating velocity of the vibration propagating plate, thereby preventing the vibration wave component which is propagated to vibration sensors from being influenced by interference of the vibration which is propagated in the supporting member, and since the vibration propagating plate is supported by the supporting member, the strength of the input surface is assured.

The second object of the invention is to provide a coordinate input apparatus in which an acoustic impedance of a supporting member which is directly in surface contact with a vibration propagating plate and supports the vibration propagating plate is different from that of the vibration propagating plate, and by setting a vibration attenuation ratio of the supporting member to be larger than that of the vibration propagating plate, the portion of the incident vibration energy which propagates from the vibration propagating plate into the supporting member can be kept as small as possible, and even if some vibration energy enters the supporting member, it can be promptly attenuated, and since the vibration propagating plate is supported by the supporting member, the strength of the input surface is assured.

The third object of the invention is to provide a coordinate input apparatus in which a contact area of a supporting member with a vibration propagating plate can be substantially reduced and an influence which is exerted on the vibration propagation of the vibration propagating plate by the supporting member can be reduced.

These and other objects, features and advantages of the invention will be more fully understood from the following detailed description of the preferred embodiments, taken in conjunction with the accompanying drawings.

DETAILED DESCRIPTION OF THE PREFERRED EMBODIMENTS

The invention will be described in detail hereinbelow on the basis of an embodiment shown in the drawings.

Figure 1:
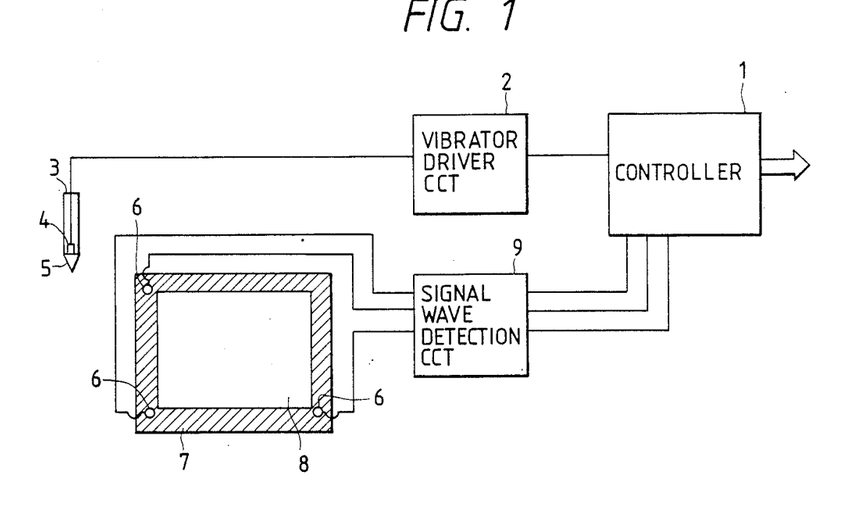
FIG. 1 is an explanatory diagram showing a construction of a coordinate input apparatus using the present invention.

FIG. 1 shows a whole structure of a coordinate input apparatus using the invention. In the apparatus of FIG. 1, coordinates are input to an input tablet comprising a vibration propagating plate 8 by a vibration pen 3.

In the diagram, the vibration which is input from the vibration pen 3 is propagated through the vibration propagating plate 8 to three vibration sensors 6 attached to three corner portions of the plate 8. In the embodiment, the propagation times of the ultrasonic vibrations which were propagated from the vibration pen 3 to the vibration sensors 6 through the vibration propagating plate 8 are measured, thereby detecting the coordinates of the vibration pen 3 on the vibration propagating plate 8.

The vibration pen 3 to propagate the ultrasonic vibration to the vibration propagating plate 8 has therein a vibrator 4 such as a piezoelectric element or the like. The ultrasonic vibration generated by the vibrator 4 is propagated to the vibration propagating plate 8 through a horn portion 5 having a pointed edge portion.

The vibrator 4 provided in the vibration pen 3 is driven by a vibrator driver circuit 2. A drive signal of the vibrator 4 is supplied as a low level pulse signal from an operating controller 1 in FIG. 1. The signal is then amplified by a predetermined gain by the vibrator driver circuit 2 which can be driven by a low impedance and, thereafter, the signal is applied to the vibrator 4. The electric drive signal is converted into the mechanical ultrasonic vibration by the vibrator 4 and propagated to the vibration propagating plate 8 through the horn portion 5.

A vibrating frequency of the vibrator 4 is selected to have a value such as to enable the vibration propagating plate 8 to generate a plate wave. On the other hand, when the vibrator is driven, a vibrating mode such that the vibrator 4 mainly vibrates in the direction perpendicular to the vibration propagating plate 8 is selected. By setting the vibrating frequency of the vibrator 4 to a resonance frequency of the vibrator 4, the electric signal can be efficiently converted into the vibration.

The elastic wave which is transferred to the vibration propagating plate 8 as mentioned above is a plate wave and has an advantage that it is hardly influenced by a scratch, an obstacle, or the like on the surface of the vibration propagating plate 8 as compared with the surface wave or the like.

Figure 2A:
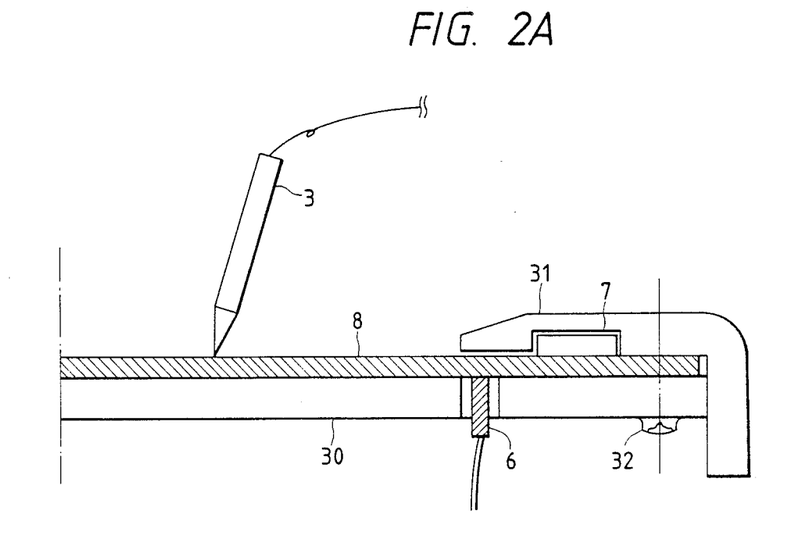
FIG. 2A is an explanatory diagram showing a construction of a vibration propagating plate and a supporting member in the coordinate input apparatus using the invention.

FIG. 2A shows a supporting structure of components around the vibration propagating plate in the coordinate input apparatus according to the invention. In FIG. 2A, the vibration propagating plate 8 serving as an input tablet is made of a metal plate of aluminum alloy or the like. A thickness of the plate 8 is set to a value within a few mm in order to efficiently transfer the plate wave by a small input energy (electric power consumption of the vibrator). Reference numeral 7 denotes a reflection preventing member to prevent that the vibration which was input by the vibration pen 3 is reflected by the edge surfaces of the vibration propagating plate 8 and interferes with the waves which are directly input to the vibration sensors. Reference numeral 31 indicates an upper casing of the input tablet to position the vibration propagating plate 8 to the coordinate input effective area on the outside of the reflection preventing material 7, thereby fixing the plate 8 by screws 32 together with a supporting member 30. The supporting member 30 reinforces the thin vibration propagating plate 8 and assures the strength of the input surface.

The vibration sensors 6 are fixed to the back surface of the vibration propagating plate 8 corresponding to the inside of the upper casing 31 of the peripheral portion of the plate 8. The vibration which was input from the vibration pen 3 is detected by the vibration sensor 6.

(First embodiment)

In the embodiment, a material (using plastics or the like), a thickness, and the like of the supporting member 30 are selected so that the vibration propagating velocity of the supporting member 30 is slower than that of the vibration propagating plate 8. The reasons will now be described hereinbelow.

Figure 3:
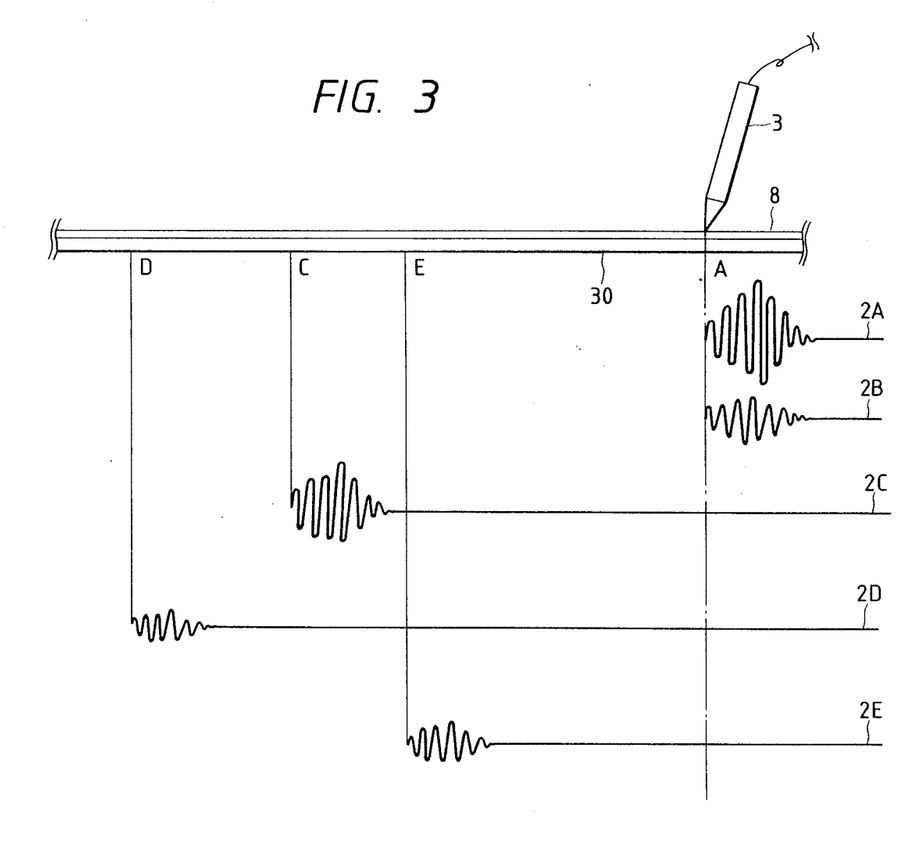
FIG. 3 is an explanatory diagram for explaining the operation of a supporting structure of the vibration propagating plate.

FIG. 3 is a schematic diagram showing the vibrations which are propagated in the vibration propagating plate 8 and supporting member 30. It is now assumed that the vibration was applied from the vibration pen 3 onto the vibration propagating plate 8 at point A. The vibrating state at point A at this time is as shown by reference numeral 2A in FIG. 3, in which the abscissa denotes a time base. When the vibration passes through the supporting member 30, a vibration as shown by reference numeral 2B is caused. Assuming that the front edge of the vibration input to the vibration propagating plate 8 has reached point C after the lapse of a certain time, its waveform similarly becomes as shown by reference numeral 2C in FIG. 3.

If, differently from the foregoing embodiment, the propagating velocity of the wave which propagates in the supporting member 30 is faster than the velocity of the wave which propagates in the vibration propagating plate 8, the wave progresses to the position of point D and its waveform becomes as shown by reference numeral 2D. On the contrary, if the velocity of the wave which propagates in the supporting member 30 is slower than that in the plate 8, the waveform becomes as shown by reference numeral 2E. The waves which propagate in the supporting member 30 contrarily exert an influence on the vibration propagating plate 8. If a phenomenon as shown by reference numeral 2D occurs, those waves influence the wave 2C which is directly propagated through the vibration propagating plate 8.

In the state shown by reference numeral 20, the output level of the detection signal waveform which is detected by the vibration sensor 6 attached to the vibration propagating plate is small. However, the wave which had passed through the supporting member 30 until a proper position and passed through the vibration propagating plate 8 from that position is first detected and the wave which propagated in only the vibration propagating plate 8 is then detected. That is, if the vibration propagating velocity in the supporting member 30 is faster than that in the vibration propagating plate 8, the waves which are propagated by the vibration propagating plate 8 and supporting member 30 mutually interfere, causing the vibration waveform on the vibration propagating plate 8 which is to be detected by the vibration sensor 6 to be deformed and causing the accuracy of the coordinate input apparatus itself to be deteriorated.

On the contrary, if the vibration propagating velocity in the supporting member 30 is slower than that in the vibration propagating plate 8 as in the embodiment, the waveform which is detected at point C is not influenced even when the supporting member 30 is attached. The distortion of the signal which is detected by the vibration sensor 6 can be reduced and the accurate vibration detection timing can be obtained. Therefore, in the coordinate detecting processes, which will be explained hereinlater, the accurate coordinate values can be derived on the basis of the accurate vibration propagating times.

Although the phenomenon a at certain point on the vibration propagating plate 8 has been described above, if the supporting member 30 and the vibration propagating plate 8 are similarly in contact with each other, interferences of the waveforms which propagate in the supporting member 30 and vibration propagating plate 8 continuously occurs. However, even in such a case, if the velocity of the wave which propagates in the supporting member 30 is slower than that in the vibration propagating plate 8, the vibration wave 2C to be inherently detected is not influenced, so that the accurate vibration detection waveform can be obtained by the vibration sensor 6.

As the vibration propagating plate 8, a transparent material such as glass can be used. As the supporting member 30, a transparent material such as an acrylic or the like may be used. In the case of using transparent materials as the plate 8 and supporting member 30, they can be used in an application where an original is placed under the input tablet and traced, or it is possible to consider a construction in which a display is arranged under the tablet and a locus which was input from the tablet is displayed. Particularly, in the case of using the display, by displaying a hand-written character, figure, or the like at the input position and with the same size, the good operability similar to that in the case of writing on paper can be realized. The coupling structure of the supporting member 30 and vibration propagating plate 8 is obviously not limited to the screw fixing method.

(Second embodiment)

In this embodiment, the supporting member 30 is in come into surface contact with the vibration propagating plate 8, thereby assuring the strength of the plate 8. On the other hand, in order to prevent the supporting member 30 exerting an adverse influence on the vibration propagation of the vibration propagating plate 8, the acoustic impedance of the supporting member 30 is set to be different from that of the plate 8, while the attenuation degree of the vibration in the supporting member 30 is set to be larger than that in the plate 8.

For this purpose, the supporting member 30 is made of, for instance, an ABS resin. As compared with the vibration propagating plate 8, since a specific acoustic impedance $\rho c$ ($\rho$: density, c: sound velocity) of the supporting member 30 largely differs, there is a feature that even if they are in contact, the vibration energy which was input to the vibration propagating plate 8 by the vibration pen is reflected by the boundary surface between the supporting member 30 and the plate 8 and is hardly transmitted through the supporting member 30.

On the other hand, a small amount of vibration energy which was transmitted to the supporting member 30 is more rapidly absorbed and attenuated due to the characteristics of the material of the supporting member 30 such that the attenuation ratio is larger than that of the vibration propagating plate 8, so that such a vibration energy does not largely influence the vibration which propagates on the vibration propagating plate 8. That is, the vibration on the plate 8 is not distorted and the waveform detection accuracy, which will be explained hereinlater, to decide the vibration detection timing does not deteriorate. The coordinates can be input with a high accuracy.

As mentioned above, by selecting the material of the supporting member 30 so that the acoustic impedance $\rho c$ differs and the attenuation ratio is set to be larger as compared with those of the vibration propagating plate 8, even if the plate 8 and supporting member 30 are in contact with each other, the principle of the coordinate input apparatus according to such a system is not lost. On the other hand, even if the input surface is enlarged, the deformation of the vibration propagating plate 8 can be minimized and sufficient strength can be given to the input tablet.

Now, it should be noted that the vibration propagating plate 8 and the supporting member 30 are merely in contact with each other. In other words, when they are observed from a microscopic viewpoint, an air layer (gaseous layer) exists between the contact surfaces of the plate 8 and supporting member 30 due to the concave and convex portions because of the surface roughness and the contact surfaces thereof are acoustically discontinuous. Therefore, for instance, when they are adhered by using an adhesive agent or if such an air layer between them is filled with a liquid layer (for instance, water, grease, or the like), they are acoustically matched. Therefore, the loss of the vibration energy, namely, the vibration energy which is propagated from the vibration propagating plate 8 to the supporting member 30, eventually increases. Thus, it is best that they are arranged in contact relation. With respect to the contact portions of the plate 8 and supporting member 30 from a microscopic viewpoint, by forming acoustic discontinuous points by changing the acoustic impedance of them, the loss of the vibration energy can be minimized.

As the vibration propagating plate 8, a transparent material such as glass can be used. As the supporting member 30, a transparent material such as an acrylic or the like may be used. In the case of using transparent materials as the plate 8 and supporting member 30, they can be used in an application where an original is placed under the input tablet and traced, or it is possible to consider a construction in which a display is arranged under the tablet and a locus which was input from the tablet is displayed. Particularly, in the case of using the display, by displaying a hand-written character, figure, or the like at the input position and with the same size, good operability similar to that in the case of writing on paper can be realized. The coupling structure of the supporting member 30 and vibration propagating plate 8 is obviously not limited to the screw fixing method.

On the other hand, in addition to the above construction, it is further considered to set the vibration propagating velocity in the supporting member 30 to be slower than that in the vibration propagating plate 8 by properly selecting the material and shape of the supporting member. If the vibration propagating velocity of the supporting member 30 is slower than that in the vibration propagating plate 8, a possibility that the vibration which is propagated in the supporting member 30 may interfere with the vibration in the vibration propagating plate 8 can be reduced still more.

(Third embodiment)

Figure 2B:
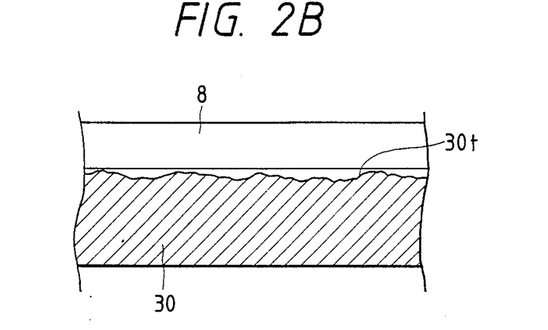
FIG. 2B is a partial enlarged diagram of FIG. 2A.

In this embodiment, although the supporting member 30 supports the vibration propagating plate 8 by the surface, when it is observed from a microscopic viewpoint, as shown in FIG. 2B, fine concave and convex portions are formed on a supporting surface 30t of the supporting member 30 to the vibration propagating plate 8. Its surface roughness is set to a value larger than 6.3S (JIS 8 0601). Thus, the vibration propagating plate 8 is not closely adhered to the supporting member 30. The vibration in the vibration propagating plate 8 is not absorbed by the supporting member 30. It is prevented that the operation of a vibration waveform detecting system, which will be explained hereinbelow, becomes unstable due to the attenuation. Particularly, even if the material of the supporting member 30 is a general ultrasonic absorbing material such as a resin or the like or even if the acoustic impedance of the supporting member 30 is near the acoustic impedance of the vibration propagating plate 8 or even when the materials of the supporting member 30 and plate 8 are the same material, the above advantages can be accomplished.

On the other hand, it is prevented that the vibration propagation distance is restricted by the absorption of the vibration by the supporting member 30. The input surface of a large area can be easily set.

The reasons why the condition of the surface roughness has been set to 6.3S or more will now be described.

TABLE 1

(unit: μ)

| Pen tip No. | 1 (defective) | 2 (defective) | 3 (Good) | 4 (Good) |
| --- | --- | --- | --- | --- |
| Max. height of mountain | 8.5 | 6.7 | 2.0 | 3.3 |
| Max. depth of valley | 4.9 | 4.5 | 2.2 | 3.2 |
| $R_x$ | 13.4S | 10.5S | 3.6S | 6.3S |
| $R_z$ | 5.1 | 3.2 | 2.3 | 1.9 |
| $R_a$ | 1.96 | 1.56 | 0.62 | 0.72 |
| Waving width of surface | About 20 | About 18 | ($= R_x$) | ($= R_x$) |

Table 1 shows the results of the experiments with respect to the relations between the vibration propagating characteristics between the two vibration propagating media which are in a contact state to the surface roughnesses of the vibration propagating media. In Table 1, the vibration propagating media are not the vibration propagating plate and its supporting member but the experimental results regarding the vibration propagation between the vibrator 4 of the vibration pen 3 and the horn portion 5 of the pen tip are shown. The same phenomenon as that in the case of the vibration propagating plate and its supporting member occurs in the example shown in Table 1 with respect to a point that two members are in contact with each other and the vibration propagation occurs therebetween.

In the example, two vibration pens having defective vibration output characteristics and two vibration pens having good vibration output characteristics are prepared. The characteristics of the surfaces of the horn portions 5 of the pen tips of those vibration pens, that is, the maximum heights of the mountains, the maximum depths of the valleys, and measurement values $R_x$, $R_z$, and $R_a$ were measured.

The measurement values $R_x$, $R_z$, and $R_a$ are defined as follows.

$R_x$: A portion of only a reference length is extracted from a cross sectional curve and the extracted portion is sandwiched by two straight lines which are parallel with an average line of the extracted portion and the interval between the two straight lines is measured in the direction of a vertical magnification of the cross sectional curve (JIS (Japanese Industrial Standard) B 0601).

$R_z$: A portion of only a reference length is extracted from a cross sectional curve, a straight line which passes through the summit of the third mountain from the highest straight line is selected from among the straight lines which are parallel with the average line of the extracted portion and a straight line which passes through the bottom of the third valley from the lowest straight line is selected from among those straight lines and the interval between the selected two straight lines is measured in the direction of a vertical magnification of the cross sectional curve.

$R_a$: A portion of a measurement length l is extracted from a roughness curve in the direction of its center line, the center line of the extracted portion is set to an X axis, the direction of the vertical magnification is set to a Y axis, and the roughness curve is expressed by $y = f(x)$. In this case, the value which is given by the following equation is $R_a$:

$$R_a = \frac{1}{l} \int_0^l |f(x)| dx$$

On the other hand, the vibration pen having defective output characteristics denotes a pen such that a vibration is input at a predetermined point on the vibration propagating plate and a detection voltage of a certain level or more cannot be obtained from a predetermined vibration sensor.

Practically speaking, in the case of the tablet used in the experiments, an output voltage of the vibration sensor having a value within a range from 1.5 to 1.6 V is necessary to normally input coordinates. In the case of the two good vibration pens (Nos. 3 and 4) in Table 1, the output voltages within such a range were obtained. However, in the case of the two defective vibration pens (Nos. 1 and 2), only the extremely low output voltages of about 0.8 to 1.0 V which are about half to ⅔ of those of the good pens were obtained.

As will be obvious from the measurement values of the pressure contact surfaces with the vibrators of the horns at the pen tips of the vibration pens in Table 1, as the degree of concave and convex portions of the pressure contact surfaces is large, the signal intensity which is obtained from the vibration sensor decreases. The applicant has executed a number of measurements with respect to vibration pens (not shown) as well and found that the vibration propagating efficiency suddenly deteriorates from about the surface roughness of 6.3S as a turning point The driving conditions of the vibration pens, the pressure contacting conditions between the vibrator and the horn, and the like are the same with regard to all of the pens. Particularly, even when the pressure contacting conditions between the vibrator and the horn are changed, the vibration propagating efficiency remarkably changes from the above boundary value as a turning point in a manner similar to the above.

As will be obvious from the above description, it will be understood that between the two contacting vibration propagating media, when the surface roughness of the contact surface is set to a value which is at least smaller than 6.3S, the vibration propagating efficiency is good and that if it is 6.3S or more, the efficiency largely deteriorates.

Therefore, as mentioned above, by setting the surface roughness of the contact surface of the supporting member 30 to the vibration propagating plate 8 to the above value or more, the vibration propagating efficiency between them is reduced and the absorption of the vibration to the side of the supporting member 30 can be prevented.

A few modifications will now be shown with respect to the construction of the supporting member 30.

It will be obvious that the surface of the supporting member 30 can be constructed so as to have a pattern such as crimps, grooves, or the like if the surface roughness is 6.3S or more.

Figure 2C:
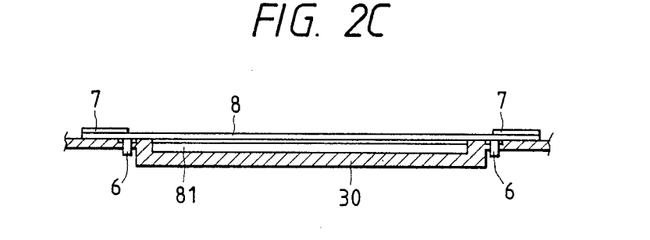
FIGS. 2C and 2D are cross sectional views showing different supporting structures of propagating plate supporting members, respectively.
Figure 2D:
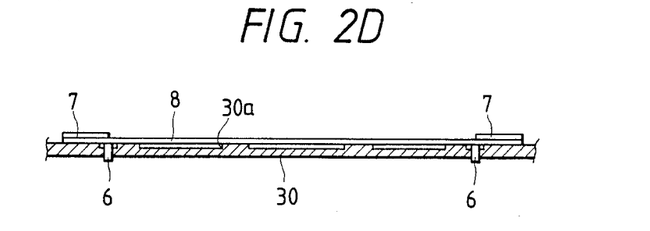

Further, FIGS. 2C and 2D show examples in which the vibration propagating plate 8 is not supported by the whole surface of the supporting member 30.

First, in FIG. 2C, the vibration propagating plate 8 is made of a transparent material, a display 81 such as a liquid crystal display or the like is arranged below the plate 8, and the supporting member 30 has a concave portion to enclose the display 81. According to such a structure, it is sufficient that the surface roughness of the contact portion of the peripheral portion of the supporting member 30 to the vibration propagating plate 8 is larger than 6.3S. According to such a structure, it is effective because a possibility such that the vibration of the vibration propagating plate 8 is propagated to the supporting member 30 is smaller. In FIG. 2C, the display 81 is fixed to the supporting member 30 side by adhesion or the like and is not in contact with the vibration propagating plate 8, so that the display 81 does not influence the propagation of the vibration of the vibration propagating plate 8. However, in the case where the display 81 is also allowed to function as a supporting member of the vibration propagating plate 8, the contact surface roughness of the display 81 to the plate 8 is set to a value within a range such as not to lose the display function in a manner similar to the surface roughness of the supporting member 30.

On the other hand, FIG. 2D shows the case where the vibration propagating plate 8 is partially supported by convex portions 30a on the upper surface of the supporting member 30. It can be considered that the convex portions 30a in FIG. 2D correspond to a state in which the surface of the supporting member 30 in FIG. 2B is extremely roughly processed. The influence on the vibration propagation of the vibration propagating plate 8 by the supporting member 30 can be reduced even by such a rough surface of the convex portions 30a. However, a larger effect can be obtained by working the surface of the contact portion of the supporting member 30 to the vibration propagating plate 8 so as to have a surface roughness larger than 6.3S in a manner similar to the case of FIG. 2C. In the structure of FIG. 2D, since the vibration propagating plate 8 is also supported even in the central portion, there is an advantage that the rigidity of the input surface can be enlarged as compared with the structure of FIG. 2C.

A construction of the vibration detecting system and coordinate operating system in the coordinate input apparatus in the first to third embodiments will now be described hereinbelow.

Returning to FIG. 1, the vibration sensors 6 provided in the corner portions of the vibration propagating plate 8 are also constructed by mechanical/electrical converting elements such as piezoelectric elements or the like. The output signals of the three vibration sensors 6 are input to a signal wave detection circuit 9 and converted into detection signals which can be processed by the operating controller 1 at the post stage. The operating controller 1 measures the vibration propagation times, thereby detecting the coordinate position of the vibration pen 3 on the vibration propagating plate 8.

Figure 4:
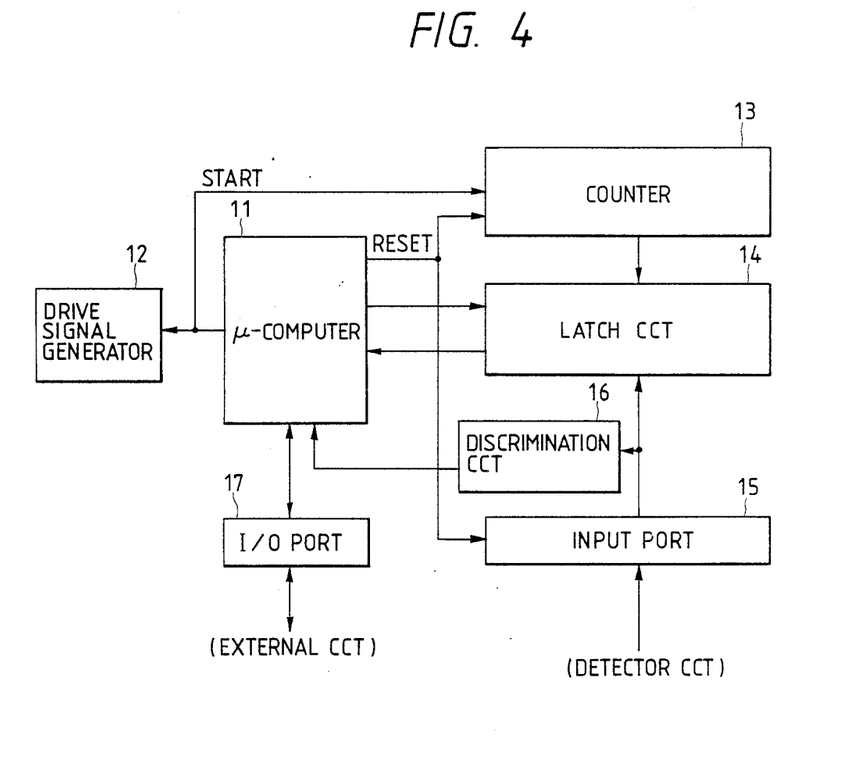
FIG. 4 is a block diagram showing a structure of an operating controller in FIG. 1.

FIG. 4 shows a structure of the operating controller 1 in FIG. 1. In this case, FIG. 4 mainly shows the structure of the driving system of the vibration pen 3 and the vibration detecting system by the vibration sensors 6. The vibration detection and the arithmetic operations of the coordinate values will now be described hereinbelow.

A microcomputer 11 has therein an internal counter, a ROM, and a RAM. A drive signal generator 12 outputs a drive pulse of a predetermined frequency to the vibrator driver circuit 2 in FIG. 1 and is made operative by the microcomputer 11 synchronously with a circuit to calculate the coordinates.

A count value of a counter 13 is latched into a latch circuit 14 by the microcomputer 11.

On the other hand, the signal wave detection circuit 9 outputs timing information of the detection signal to measure the vibration propagation times from the outputs of the vibration sensors 6 as will be explained hereinlater. The timing information is input to an input port 15, respectively.

The timing signal which is input from the wave detection circuit 9 is input to the input port 15 and stored into a memory area corresponding to each vibration sensor 6 in the latch circuit 14. The result is transmitted to the microcomputer 11.

That is, the vibration propagation time is expressed as a latch value of the output data of the counter 13 and the coordinates are calculated by the vibration propagation time value.

Figure 5:
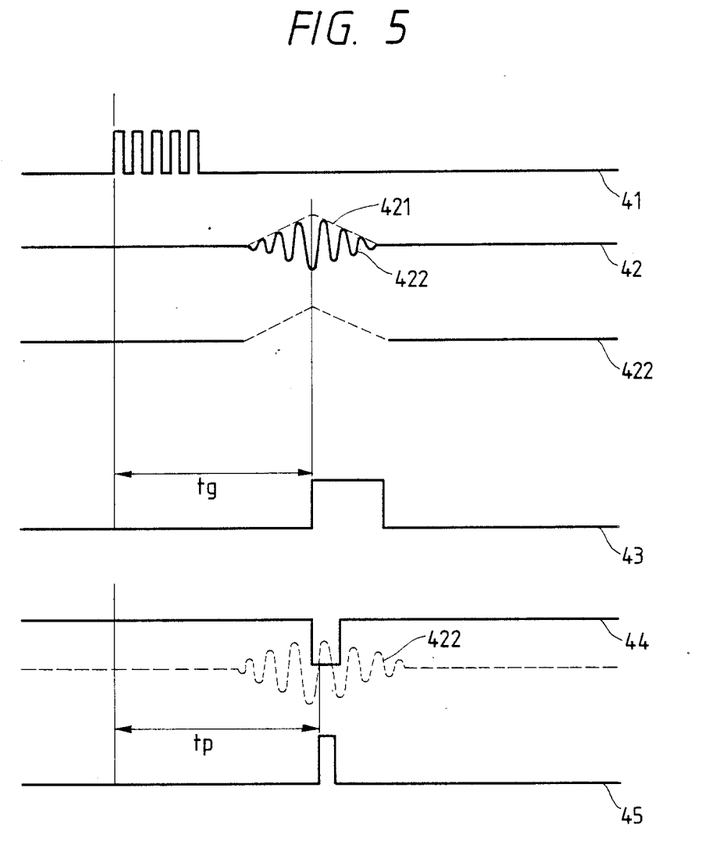
FIG. 5 is a waveform diagram showing detection waveforms for explaining the measurement of the distances between a vibration pen and vibration sensors.

FIG. 5 is a diagram for explaining the detection waveform which is input to the signal wave detection circuit 9 in FIG. 1 and the measuring process of the vibration propagation time based on the detection waveform. In FIG. 5, reference numeral 41 denotes a drive signal pulse which is applied to the vibration pen 3. The ultrasonic vibration which was propagated to the vibration propagating plate 8 from the vibration pen 3 which was driven by such a waveform passes in the plate 8 and is detected by the vibration sensors 6.

After the vibration progressed in the vibration propagating plate 8 for a time $t_g$ corresponding to the distance to the vibration sensor 6, the vibration reaches the sensor 6. In FIG. 5, reference numeral 42 denotes a signal waveform detected by the vibration sensor 6. The plate wave which is used in the embodiments is a dispersive wave. Therefore, the relation between an envelope 421 and a phase 422 of the detection waveform changes in accordance with the vibration propagation distance.

Now, a progressing velocity of the envelope assumes a group velocity $V_g$ and a phase velocity assumes $V_p$. The distance between the vibration pen 3 and the vibration sensor 6 can be detected from the difference between the group velocity and the phase velocity.

First, when paying an attention to only the envelope 421, the velocity is set to $V_g$. When a point on a certain special waveform, for instance, the peak is detected as shown by reference numeral 43 in FIG. 5, a distance d between the vibration pen 3 and the vibration sensor 6 is calculated as follows:

$$d = V_g \cdot t_g \quad (1)$$

where, the group vibration propagation time assumes $t_g$. Although the above equation relates to one of the vibration sensors 6, the distance between each of the other two vibration sensors 6 and the vibration pen 3 can be shown by the same equation.

Further, to determine the coordinate values at a higher accuracy, the process based on the detection of the phase signal is executed. Assuming that a time interval from a special detection point of the phase waveform 422 in FIG. 5, for instance, from the point when the vibration was applied to the zero cross point after the passage of the peak point is set to $t_p$, the distance between the vibration sensor and the vibration pen is calculated as follows:

$$d = n \cdot \lambda_p + V_p \cdot t_p \quad (2)$$

$\lambda_p$ denotes a wavelength of the elastic wave and n is an integer.

From the equations (1) and (2), the integer n is obtained by $$n = [(V_g \cdot t_g - V_p \cdot t_p)/\lambda_p + 1/N] \quad (3)$$

N is a real number other than 0 and is set to a proper numerical value. For instance, when N = 2 and a fluctuation of the group delay time $t_g$ lies within a range of $\pm \frac{1}{2}$ wavelength, n can be decided.

By substituting the value of n obtained as mentioned above in the equation (2), the distance between the vibration pen 3 and the vibration sensor 6 can be accurately measured.

Figure 6:
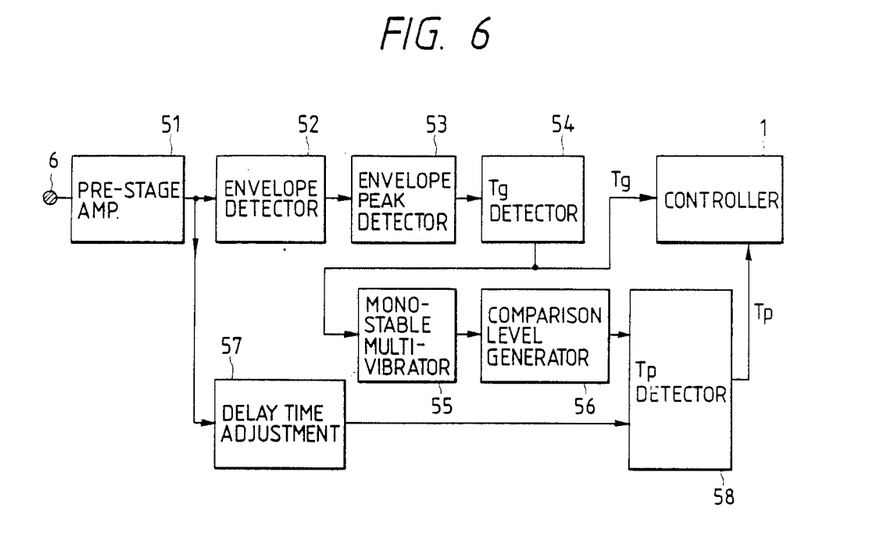
FIG. 6 is a block diagram showing a construction of a waveform detection circuit in FIG. 1.

To measure the two vibration propagation times $t_g$ and $t_p$ shown in FIG. 5, the signal wave detection circuit 9 can be constructed as shown in, for instance, FIG. 6.

In FIG. 6, the output signal of the vibration sensor 6 is amplified to a predetermined level by a pre-stage amplifier 51. The amplified signal is input to an envelope detector 52 and only the envelope of the detection signal is extracted. The timing of the peak of the extracted envelope is detected by an envelope peak detector 53. From the peak detection signal, an envelope delay time detection signal $T_g$ of a predetermined waveform is formed by a $T_g$ signal detector 54 comprising a monostable multivibrator or the like and is input to the operating controller 1.

On the other hand, from the $T_g$ signal and the original signal which was delayed by a delay time adjustment circuit 57, a phase delay time detection signal $T_p$ is formed by a $T_p$ detector 58 and is input to the operating controller 1.

The above-described circuit relates to one of the vibration sensors 6 and the same circuit is also provided for each of the other sensors. Assuming that the number of sensors is generally set to h, h detection signals of envelope delay times $T_{gl}$ to $T_{gh}$ and h detection signals of phase delay times $T_{pl}$ to $T_{ph}$ are input to the operating controller 1, respectively.

The operating controller 1 in FIG. 1 receives the signals $T_{gl}$ to $T_{gh}$ and $T_{pl}$ to $T_{ph}$ from the input port 15 and latches the count value of the counter 13 into the latch circuit 14 by using those timings as triggers. Since the counting operation of the counter 13 is started synchronously with the driving of the vibration pen, the data indicative of the delay times of the envelopes and phases are latched into the latch circuit 14.

Figure 7:
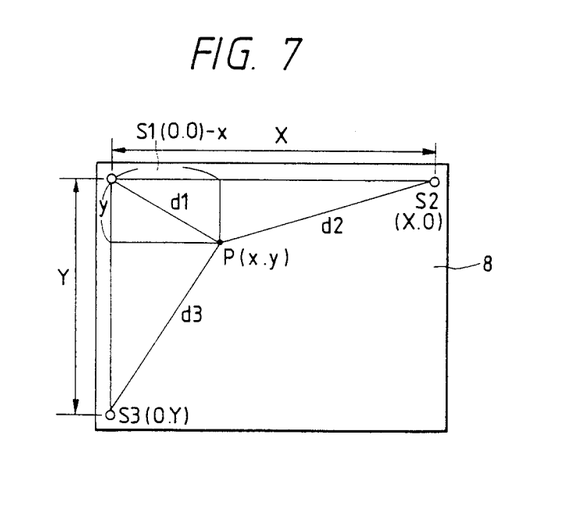
FIG. 7 is an explanatory diagram showing an arrangement of the vibration sensors.

When the three vibration sensors 6 are arranged at corner positions $S_1$ to $S_3$ of the vibration propagating plate 8 as shown in FIG. 7, rectilinear distances $d_1$ to $d_3$ from the position P of the vibration pen 3 to the positions of the vibration sensors 6 can be obtained by the processes described in conjunction with FIG. 5. Further, the coordinates (x, y) of the position P of the vibration pen 3 can be obtained by the operating controller 1 on the basis of the rectilinear distances $d_1$ to $d_3$ from the theorem of three squares by the following equations:

$$x = X/2 + (d_1 + d_2)(d_1 - d_2)/2X \quad (4)$$

$$y = Y/2 + (d_1 + d_3)(d_1 - d_3)/2Y \quad (5)$$

where X and Y denote distances along X and Y axes between the vibration sensors 6 at the positions $S_2$ and $S_3$ and the sensor at the origin (position $S_1$), respectively.

The position coordinates of the vibration pen 3 can be detected in a real-time manner.

As will be obvious from the above, according to the invention, in a coordinate input apparatus in which the vibration which was input from the vibration pen is detected by a plurality of sensors attached to a vibration propagating plate and the coordinates of the vibration pen on the vibration propagating plate are detected, there is provided a supporting member which is directly come into surface contact with the vibration propagating plate and supports the vibration propagating plate, an acoustic impedance of the supporting member is different from that of the vibration propagating plate, and a vibration attenuation ratio of the supporting member is set to be larger than that of the vibration propagating plate. Therefore, there are excellent advantages such that the vibration wave component which is propagated to the vibration sensor is not influenced by the interference of the vibration which is propagated in the supporting member, the coordinates can be accurately detected on the basis of the vibration detection waveform without a distortion, the strength of the input surface is assured by supporting the vibration propagating plate by the supporting member, and the like.

On the other hand, there is used a construction such that the supporting member which is directly in surface contact with the vibration propagating plate and supports the vibration propagating plate is provided and the vibration propagating velocity of the supporting member is set to be slower than that of the vibration propagating plate. Therefore, the vibration propagating velocity of the supporting member which is directly in surface contact with the vibration propagating plate and supports the vibration propagating plate is set to be slower than the vibration propagating velocity of the vibration propagating plate. Thus, there are excellent advantages such that the vibration wave component which is propagated to the vibration sensors is not influenced by the interference of the vibration which is propagated in the supporting member, the coordinates can be accurately detected on the basis of the vibration detection waveform without a distortion, and the strength of the input surface is assured by supporting the vibration propagating plate by the supporting member, and the like.

On the other hand, there is used a construction such that the surface roughness of at least a part of the contact surface of the supporting member for supporting the vibration propagating plate in a contacting state with the vibration propagating plate is set to a large value. Therefore, there are excellent advantages such that the contact area between the supporting member and the vibration propagating plate can be substantially reduced and the influence which is exerted on the vibration propagation of the vibration propagating plate by the supporting member can be reduced, so that the deterioration of the coordinate inputting accuracy due to the vibration attenuation of the supporting member or the reduction of the vibration propagation distance does not occur, and the coordinates can be stably and accurately input.

What is claimed is:

1. A coordinate input apparatus comprising:
vibration generating means for generating a vibration;
a vibration propagating member for propagating the vibration generated by said vibration generating means by allowing the vibration generating means to come into contact with said vibration propagating means;
vibration detecting means for detecting a vibration which is propagated to the vibration propagating member;
a supporting member which supports the vibration propagating member and in which a vibration propagating velocity is slower than that of the vibration propagating member; and
position coordinate calculating means for calculating coordinates of a position where the vibration generating means which has come into contact with the vibration propagating member on the basis of a detection signal from the vibration detecting means.

2. An apparatus according to claim 1, wherein a material of the vibration propagating member is metal and a material of the supporting member to support the vibration propagating member is a synthetic resin.

3. An apparatus according to claim 1, wherein a material of the vibration propagating member is transparent glass and a material of the supporting member for supporting the vibration propagating member is a transparent synthetic resin.

4. An apparatus according to claim 3, wherein display means for displaying the coordinates of the position which was calculated by said position coordinate calculating means is further provided below the supporting member.

5. An apparatus according to claim 1, wherein the vibration propagating member and the supporting member are plate-shaped members of the same material and their thicknesses are different.

6. A coordinate input apparatus comprising:
vibration generating means for generating a vibration;
a vibration propagating member for propagating the vibration generated by the vibration generating means by allowing the vibration generating means to come into contact with the vibration propagating member;
vibration detecting means for detecting the vibration which is propagated to the vibration propagating member;
a supporting member which supports the vibration propagating member and in which an acoustic impedance value is different from that of the vibration propagating member; and
position coordinate calculating means for calculating coordinates of a position where the vibration generating means which has come into contact with the vibration propagating member on the basis of a detection signal from the vibration detecting means.

7. An apparatus according to claim 6, wherein an attenuation ratio of the vibration of the supporting member is larger than that of the vibration propagating member.

8. An apparatus according to claim 6, wherein a material of the vibration propagating member is transparent glass and a material of the supporting member for supporting the vibration propagating member is a transparent synthetic resin.

9. An apparatus according to claim 8, wherein display means for displaying the coordinates of the position calculated by the position coordinate calculating means is further provided below the supporting member.

10. An apparatus according to claim 6, wherein the vibration propagating velocity of the supporting member is slower than that of the vibration propagating member.

11. A coordinate input apparatus comprising:
vibration generating means for generating a vibration;
a vibration propagating member for propagating the vibration generated by the vibration generating means by allowing the vibration generating means to come into contact with the vibration propagating member;
vibration detecting means for detecting the vibration which is propagated to the vibration propagating member;
a supporting member which supports the vibration propagating member and in which a roughness of a contact surface which contacts the vibration propagating member is 6.3S (S denotes a unit of Japanese Industrial Standard B 0601) or less; and
position coordinate calculating means for calculating coordinates of a position where the vibration generating means which has come into contact with the vibration propagating member on the basis of a detection signal from the vibration detecting means.

12. An apparatus according to claim 11, wherein a material of the vibration propagating member is transparent glass and a material of the supporting member which supports the vibration propagating member is a transparent synthetic resin.

13. An apparatus according to claim 12, wherein display means for displaying the coordinates of the position calculated by the position coordinate calculating means is further provided below the supporting member.

* * * * *

UNITED STATES PATENT AND TRADEMARK OFFICE
CERTIFICATE OF CORRECTION

PATENT NO. : 4,980,518
DATED : December 25, 1990
INVENTOR(S) : KATSUYUKI KOBAYASHI ET AL.

It is certified that error appears in the above-identified patent and that said Letters Patent is hereby corrected as shown below:

ON THE TITLE PAGE,
AT [75] INVENTORS

"Yichiro Yoshimura," should read --Yuichiro Yoshimura,--.

ON THE TITLE PAGE,
AT [57] ABSTRACT

Line 13, "membrr." should read --member--.

COLUMN 1

Line 19, "hand-written" should read --handwritten--.
Line 48, "such" should be deleted.
Line 49, "a" should read --the--.

COLUMN 2

Line 4, "progagating" should read --propagating--.

COLUMN 3

Line 27, "cross sectional" should read --cross-sectional--.

COLUMN 5

Line 20, "reference numeral 20," should read --reference numeral 2D,--.
Line 50, "a at" should read --at a--.
Line 54, "interferences" should read --interference--.

UNITED STATES PATENT AND TRADEMARK OFFICE
CERTIFICATE OF CORRECTION

PATENT NO. : 4,980,518

DATED : December 25, 1990

INVENTOR(S) : KATSUYUKI KOBAYASHI ET AL.

It is certified that error appears in the above-identified patent and that said Letters Patent is hereby corrected as shown below:

COLUMN 6

Line 5, "hand-written" should read --handwritten--.
Line 13, "member 30 is in" should read --member 30--.
Line 14, "come" should read --comes--.

COLUMN 7

Line 21, "hand-written" should read --handwritten--.
Line 25, "supporing" should read --supporting--.
Line 48, "6.3S(JIS 8 0601)." should read
--6.3S(JIS B 0601).--.

COLUMN 8

Line 42, "cross sectional" should read
--cross-sectional--.

Line 51, "cross sectional" should read
--cross-sectional--.

Line 60, "cross sectional" should read
--cross-sectional--.

UNITED STATES PATENT AND TRADEMARK OFFICE
CERTIFICATE OF CORRECTION

PATENT NO. : 4,980,518

DATED : December 25, 1990

INVENTOR(S) : KATSUYUKI KOBAYASHI ET AL.

It is certified that error appears in the above-identified patent and that said Letters Patent is hereby corrected as shown below:

COLUMN 9

Line 31, "point The" should read --point. The--.

Signed and Sealed this

Fourteenth Day of July, 1992

Attest:

DOUGLAS B. COMER

Attesting Officer      Acting Commissioner of Patents and Trademarks